(No Model.)
F. A. CLOUDMAN.
PROCESS OF RECOVERING SODA.
No. 418,274. Patented Dec. 31, 1889.
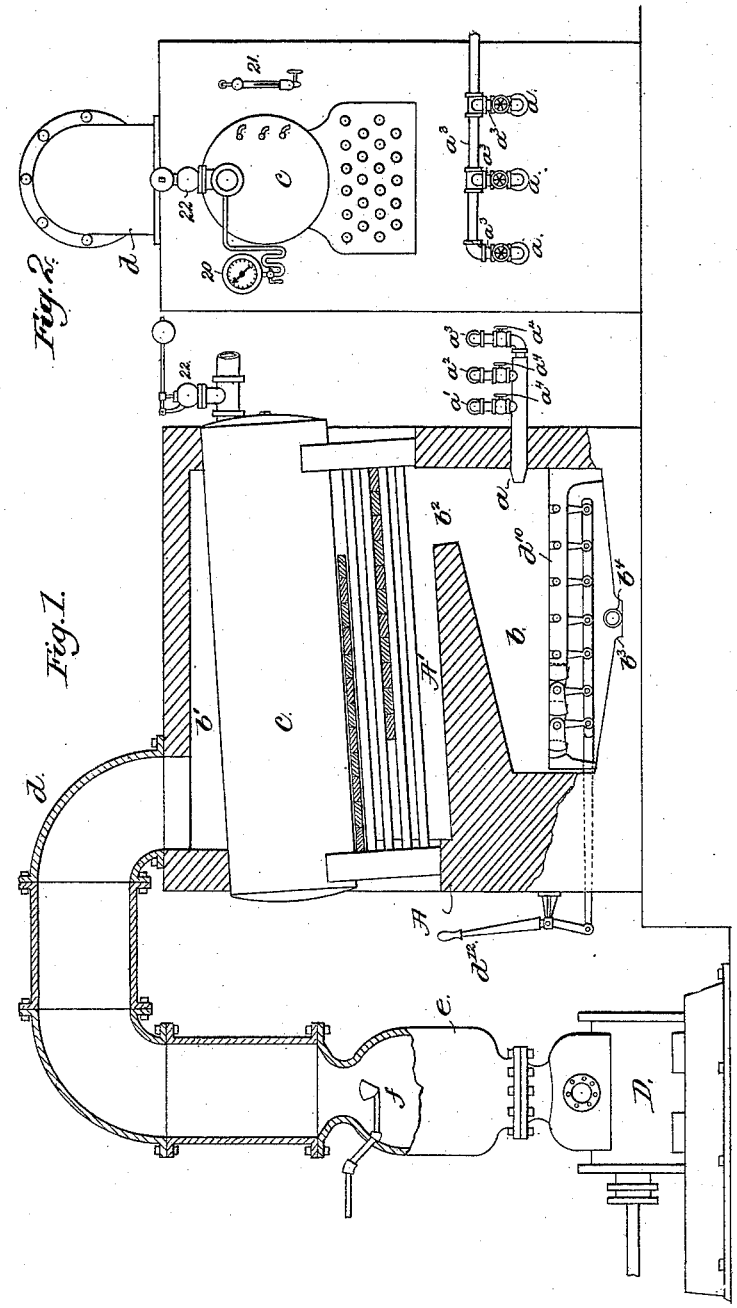
Witnesses.
Fred. S. Greenleaf
Frederick L. Emery.
Inventor.
Francis A. Cloudman
By Crosby & Gregory
Attys.

UNITED STATES PATENT OFFICE.

FRANCIS A. CLOUDMAN, OF CUMBERLAND MILLS, MAINE, ASSIGNOR TO S. D. WARREN & CO., OF BOSTON, MASSACHUSETTS.

PROCESS OF RECOVERING SODA.

SPECIFICATION forming part of Letters Patent No. 418,274, dated December 31, 1889.

Application filed July 21, 1888. Serial No. 230,661. (No specimens.)

*To all whom it may concern:*

Be it known that I, FRANCIS A. CLOUDMAN, of Cumberland Mills, county of Cumberland, State of Maine, have invented an Improvement in the Method or Process of Recovering Soda, of which the following description, in connection with the accompanying drawings, is a specification, like letters and figures on the drawings representing like parts.

This invention relates to a novel method for recovering chemicals—such as alkalies, alkaline earths, and other substances—from solutions, or when mixed with substances which are volatilizable or destructible by heat, my improved method being especially adapted for recovering soda from the spent or waste liquors of pulp-digesters. The waste or spent liquors referred to contain or hold in suspension substantially large quantities of carbonaceous matter—such as resins, gums, &c.—extracted from the wood, straw, or other like material by the soda solution employed in the manufacture of pulp.

This invention has for its object to treat the spent or waste liquors as will be described, whereby the carbonaceous matter contained therein may be consumed and the heat generated thereby preferably utilized for generating steam, the soda thus freed from carbonaceous matter being left in condition to be again used.

In accordance with my invention the spent liquor is preferably evaporated to a consistency of about 35° Baumé in any suitable form of evaporating apparatus. The partially-evaporated liquid is next introduced into the combustion-chamber of a furnace of any desired construction through an atomizer, as will be described. The combustion-chamber is preferably heated substantially to an incandescent heat, so that the carbonaceous matter fed into the said chamber with the atomized spent liquor may be consumed. The gases generated by the consumption of the carbonaceous matter referred to may be conducted to a condenser or wash-tower, where any soda carried off from the combustion-chamber thereby may be recovered, the said gases preferably impinging upon a boiler located in the furnace to heat water therein to generate steam. The soda thus freed from carbonaceous matter, which constitutes the chief impurity thereof, collects upon the floor of the combustion-chamber in a substantially-fused liquid condition, and may be discharged therefrom through a suitable door or tap, preferably into wagons, by which it may be conveyed to the cooling-room.

The particular features in which my invention consists will be pointed out in the claims at the end of this specification.

Figure 1 shows in section and elevation a sufficient portion of an apparatus embodying my invention to enable it to be understood, the furnace being shown in section; and Fig. 2, a side elevation of the furnace shown in Fig. 1, looking toward the right.

The furnace A, of brick or other suitable material, is divided, as herein shown, by a substantially-horizontal wall $A'$ into two chambers $b\ b'$, connected by a passage $b^2$. The chamber $b'$, as herein shown, contains a boiler $c$ of any desired or suitable style or type, in which steam may be generated, it being provided with the usual appurtenances, such as pressure-gage 20, water-gage 21, safety-valve 22, &c.

The chamber $b$, constituting the combustion-chamber of the furnace, has communicating with it, as shown, pipes $a$, (herein shown as three in number,) the said pipes constituting inlet-pipes for the said chamber. Each pipe $a$, as shown, has connected to it pipes $a'\ a^2\ a^3$, provided with suitable cocks $a^4$, the pipe $a'$ being connected to a steam-supply, (it may be the steam dome or space of the boiler $c$,) the pipe $a^2$ to an oil-supply, (not shown,) and the pipe $a^3$ preferably to an evaporating-chamber, in which the spent liquor is condensed to about 35° Baumé. The pipes $a'\ a^2\ a^3$ are connected together, as herein shown, to the pipes $a$, and constitute the atomizer of my apparatus, by which the spent liquor is injected into the chamber $b$ in substantially a finely-divided state or spray; but I do not desire to limit my invention to this particular form of atomizer, as any other form of atomizer or arrangement of pipes by which the spent liquor is sprayed or finely divided may be used.

In operation the chamber $b$ is first preferably heated substantially to the point of incandescence by oil supplied by the pipe $a^2$ or in other suitable manner. The cock $a^4$ of the pipe $a^3$ is now opened to admit the partially-evaporated spent liquor, which is atomized or injected into the chamber $b$ by preferably-superheated steam admitted into the pipe $a$ through the pipe $a'$, the cock $a^4$ in the pipe $a'$ being opened. The carbonaceous matter contained in the spent liquid is consumed in the chamber $b$, and the gases thus generated pass into the chamber $b'$ by passage $b^2$, the said heated gases, after impinging upon the boiler $c$ and generating steam therein, finding an exit through a pipe $d$, connected to a condenser or wash-tower $e$, the said gases in the condenser or wash-tower $e$, as herein shown, being subjected to a spray of water issuing from a pipe $f$, connected to a suitable source of supply, and by which any soda carried over may be condensed or washed out of the gases passing therethrough, the resulting liquid being carried away, as shown, by the pumps D. The consumption of the carbonaceous matter maintains the temperature of the furnace $b$ substantially at the point of incandescence, so that after the chamber $b$ has been once heated the oil or other source of supply may be cut off; but, if desired, the oil may be admitted with the superheated steam through the pipe $a^2$ to assist in the combustion of the carbonaceous matter. The soda injected into the chamber $b$ strikes the walls thereof, which are preferably circular or concaved, so that the soda, in substantially a fused or liquid condition, may flow toward a duct or channel $b^3$, leading to the outlet door or tap $d^\times$, thus facilitating removal of the fused soda from the said chamber.

If it is desired to recover the soda in the form of black-ash—that is, with part of the carbon remaining unconsumed—a grate $d^{10}$, rocked or made movable by a lever $d^{12}$ or in any suitable manner, may be located above the floor of the combustion-chamber, and the soda collected upon the said grate and sifted therethrough, as desired, the said soda not being exposed to the heat sufficiently long to burn off all the carbon or the temperature of the furnace being maintained somewhat below the incandescent point.

Instead of using superheated steam to inject the spent liquor into the combustion-chamber, I may employ compressed air or other gas.

The grate $d^{10}$ may be of any desired type of rocking grate; but I prefer to employ a rocking grate substantially such as shown in United States Patent No. 273,437, dated March 6, 1883.

I claim—

1. The method of recovering chemicals which consists in injecting as spray a mixture containing the chemical to be recovered into a combustion-chamber and burning said mixture as fuel, substantially as described.

2. That improvement in the art or method of recovering soda or other chemicals from the waste or spent liquors of pulp-digesters which consists in atomizing the spent liquor mixed with hydrocarbon into a heated furnace, whereby the soda is substantially freed from carbonaceous matter contained in the spent liquor, substantially as described.

3. That improvement in the art or method of recovering soda or other chemicals from the waste or spent liquors of pulp-digesters which consists in injecting or spraying the waste liquor by means of steam and oil into a heated furnace, whereby the said soda is substantially freed from carbonaceous matter, substantially as described.

4. The method of recovering spent soda-liquor of wood-pulp manufacture which consists in atomizing said liquor and then burning said liquor as fuel, substantially as described.

5. The method of recovering spent soda-liquor of wood-pulp manufacture which consists in blowing said liquor into a finely-divided spray by means of the atomizing action of a jet of steam, air, or other gas, and then burning said atomized liquor, substantially as described.

In testimony whereof I have signed my name to this specification in the presence of two subscribing witnesses.

FRANCIS A. CLOUDMAN.

Witnesses:
JAS. H. CHURCHILL,
F. L. EMERY.